(No Model.)

H. W. MORROW.
NUT LOCK.

No. 346,823. Patented Aug. 3, 1886.

Witnesses:
David S. Williams
William J. Davis

Inventor:
Henry W. Morrow
by his Attorneys
Howson & Son

UNITED STATES PATENT OFFICE.

HENRY W. MORROW, OF WILMINGTON, DELAWARE.

NUT-LOCK.

SPECIFICATION forming part of Letters Patent No. 346,823, dated August 3, 1886.

Application filed April 8, 1886. Serial No. 198,217. (No model.)

*To all whom it may concern:*

Be it known that I, HENRY W. MORROW, a citizen of the United States, residing in Wilmington, Delaware, have invented certain Improvements in Locking Washers and Nuts, of which the following is a specification.

My invention relates to locking washers or nuts made of layers of paper or other fibrous material chemically treated and compressed, so as to cause the layers to adhere, this material being known under various names—such as "celluvert," "vulcanized fiber," "gelatinized fiber," "leatheroid," "parchment paper," &c.

The object of my invention is to so make a washer or nut of such material that said washer or nut will cling tightly to the bolt or other device to which it is applied.

Figure 1:
Figure 2:
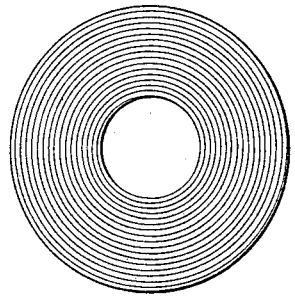
Figure 3:
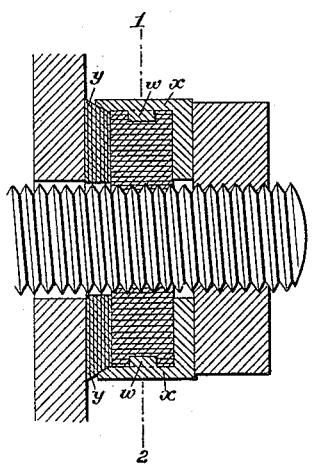
Figure 4:
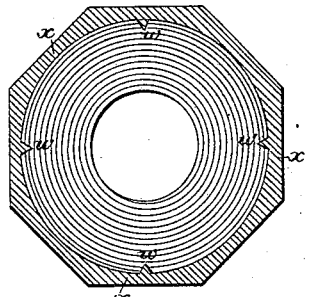

In the accompanying drawings, Figure 1 is a sectional view of a washer constructed in accordance with my invention; Fig. 2, a face view of the same; Fig. 3, a sectional view showing another form of washer, also in accordance with my invention; and Fig. 4, a transverse section on the line 1 2, Fig. 3.

Hitherto in making washers or nuts of chemically-treated fibrous material, it has been usual to punch or otherwise cut the nuts or washers from sheets or slabs of said material, and in consequence the layers of the material and the direction of the fiber in the nut or washer have been transverse, and as the material when subjected to the action of water or the vapor of water swells or expands in a direction transversely to the direction of the fiber it follows that such nuts or washers are simply increased in thickness by this expansion.

I make a nut or washer in which the expansion of the fiber, due to the moistening of the same, is utilized to insure the locking of the nut or washer to the bolt or other stem to which it is applied, and with this end in view I make the nut or washer by coiling the chemically-treated paper or other fibrous material on a mandrel, the diameter of which is governed by the size of opening desired until a roll having the desired number of layers is produced, the preferable plan being to roll the paper or other material in the form of a tube, and then to cut said tube into pieces of a proper size for the production of the nut or washer. Said nut or washer will consequently have the layers of fiber disposed in the form of a flat helix and in lines practically concentric with the axis; hence any expansion of the fiber, due to the moistening of the same, will tend to cause it to expand or swell in the direction of the arrows shown in Fig. 1, so that it will bind firmly upon the bolt or other stem to which it is applied, the washer being such as to retain itself on the bolt even if the nut in connection with which it is used has been removed.

In order that all the expansion of the material shall be exerted to decrease the diameter of the central opening of the nut or washer, I prefer to confine the washer or nut exteriorly by means of a ring or shell, $x$, of metal or other material. This ring or shell may also have a square, hexagonal, or other external configuration, so as to provide means for screwing the washer or nut onto the threaded stem of a bolt, in which case the bolt may be caused to cut a thread in the washer or nut. The outer shell or case may be provided with internal lugs, fins, or other projections, $w$, or otherwise so constructed that the fibrous portion of the washer or nut is prevented from turning independently of the shell, and said lugs or projections may be such as to likewise prevent the endwise withdrawal of the shell from the fibrous portion of the washer or nut. (See Fig. 3.)

In some cases I prefer to use in connection with a nut constructed in accordance with my invention a washer of the ordinary construction—that is to say, one having the layers of fibrous material disposed transversely, as shown, for instance, at $y$, Fig. 3, as in this case I have not only the binding of my improved washer upon the bolt, but also the lateral swelling of the washer at $y$, tending to prevent the loosening of the nut.

When my improved washer is applied to the threaded portion of a bolt, the expansion or swelling of the fiber may be relied upon to cause said washer to enter the threads of the bolt and form a nut, and when additional security is desired the bolt may be grooved, slotted, or recessed at the point where the washer is to be applied, so that when the washer expands or swells a portion of the same will enter the said groove, slot, or recess, and thus effectually lock the washer to the bolt.

The washer may be composed of two or more sections or rings of different diameters, disposed one over the other until the proper thickness is reached, and a section having the layers arranged in the form of a flat helix may be combined with a section having the layers arranged transversely, so as to obtain the effect of both these plans in one washer.

My improved nut or washer, owing to the arrangement of the layers of fiber in the form of a flat helix, is stronger than a nut or washer punched from a flat sheet, and will effectually resist strains which would disrupt such punched washers or nuts.

Another advantage of the washer made from a tube as set forth herein is its economy, there being no waste, as there is when the washers are punched from a flat slab or sheet.

I am aware that washers have been made by coiling a strip spirally—that is to say, so that each convolution would overlie that in advance in the direction of the axis of the coil; but my improved washer is distinct from this, in that it has the layers disposed in the form of a flat helix—that is to say, the strip is wound in a coil of gradually-increasing diameter, but maintaining the same plane.

I therefore claim as my invention—

1. A locking nut or washer composed of layers of fibrous material, and having said layers disposed in the form of a flat helix, all substantially as specified.

2. A locking nut or washer composed of layers of fibrous material, and having said layers disposed in the form of a flat helix, in combination with an inclosing ring or shell, all substantially as specified.

3. The combination of a bolt with two washers of fibrous material, one having the layers disposed in the form of a flat helix, and the other having the layers disposed transversely, all substantially as specified.

In testimony whereof I have signed my name to this specification in the presence of two subscribing witnesses.

HENRY W. MORROW.

Witnesses:
  WM. F. DAVIS,
  HARRY SMITH.